United States Patent
Banerjee et al.

(10) Patent No.: US 12,223,431 B2
(45) Date of Patent: Feb. 11, 2025

(54) INVERSE NEURAL NETWORK FOR PARTICLE DETECTION IN A SOLID-STATE-DEVICES

(71) Applicant: Siemens Medical Solutions USA, Inc., Malvern, PA (US)

(72) Inventors: Srutarshi Banerjee, Chicago, IL (US); Miesher Rodrigues, Buffalo Grove, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 229 days.

(21) Appl. No.: 16/850,306

(22) Filed: Apr. 16, 2020

(65) Prior Publication Data

US 2021/0133589 A1    May 6, 2021

Related U.S. Application Data

(60) Provisional application No. 62/927,983, filed on Oct. 30, 2019.

(51) Int. Cl.
*G06N 3/088* (2023.01)
*G01T 1/16* (2006.01)
*G06N 3/045* (2023.01)

(52) U.S. Cl.
CPC ............. *G06N 3/088* (2013.01); *G06N 3/045* (2023.01); *G01T 1/16* (2013.01)

(58) Field of Classification Search
CPC ...... G06N 20/00; G06N 3/088; G06N 3/0454; G16H 30/40; A61B 5/7267; A61B 6/032; G01T 1/16
See application file for complete search history.

(56) References Cited

U.S. PATENT DOCUMENTS

| | | | |
|---|---|---|---|
| 11,054,310 B2 * | 7/2021 | Wang | H04N 23/55 |
| 2011/0279143 A1 * | 11/2011 | Toba | G01B 15/00 |
| | | | 324/762.05 |
| 2019/0179327 A1 * | 6/2019 | Martin | G06V 10/764 |
| 2019/0197731 A1 * | 6/2019 | Potnis | H04N 7/183 |
| 2019/0385047 A1 * | 12/2019 | Lei | G06F 30/27 |
| 2020/0043163 A1 * | 2/2020 | Jin | G06N 3/048 |
| 2020/0211236 A1 * | 7/2020 | Zhang | G06N 3/084 |
| 2020/0234471 A1 * | 7/2020 | Lu | G06T 7/11 |
| 2021/0183117 A1 * | 6/2021 | Berker | A61B 6/4241 |
| 2022/0113265 A1 * | 4/2022 | Rothe | G06T 5/50 |

OTHER PUBLICATIONS

Bruyndonckx et al ("Evaluation of Machine Learning Algorithms . . . PET detectors", IEEE transactions on Nuclear Science, vol. 55, No. 3, Jun. 2008, pp. 918-924; (Year: 2008).*

(Continued)

*Primary Examiner* — Michael N Opsasnick

(57) ABSTRACT

For training to and/or estimating location, energy level, and/or time of occurrence of incident radiation on a solid-state detector, a machine-learned model, such as a neural network, performs the inverse problem. An estimate of the location, energy level, and/or time is output by the machine-learned model in response to input of the detected signal (e.g., voltage over time). The estimate may account for material property variation of the solid-state detector in a rapid and easily calculated way, and with a minimal amount of data.

17 Claims, 4 Drawing Sheets

(56) References Cited

OTHER PUBLICATIONS

Bruyndonckx et al (Neural Network Based Position Estimators for PET Detectors . . . blocks, IEEE Transactions on Nuclear Science, vol. 51, No. 5, Oct. 2004) (Year: 2004).*

Borghi et al "Experimental Validaton of an Efficient . . . Monolithic Scintillator Detectors", IEEE transaction on Nuclear Science, vol. 62 , No. 1, Feb. 2015, pp. 57-67 (Year: 2015).*

Sanaat et al ("Accurate estimation of depth of interaction in PET . . . neural network and Monte Carlo simulations", 2019 IEEE Nuclear SCience Syposium and Medical Imaging Conference; 3 pages (Year: 2019).*

Goodfellow, I., et al. Generative Adversarial Nets. In Advances in neural information processing systems. 2014. (pp. 2672-2680).

* cited by examiner

INVERSE NEURAL NETWORK FOR PARTICLE DETECTION IN A SOLID-STATE-DEVICES

RELATED APPLICATIONS

The present patent document claims the benefit of the filing date under 35 U.S.C. § 119(e) of Provisional U.S. Patent Application Ser. No. 62/927,983, filed Oct. 30, 2019, which is hereby incorporated by reference.

BACKGROUND

Solid-state (semiconductor) materials are used as detectors, such as detectors for medical computed tomography, single photon emission computed tomography, or x-ray imaging. These semiconductor materials (e.g., CdZnTe, CdTe, HPGe, and TIBr) have unique properties due to the regular crystal lattice structure of the material. The electrical signals generated at the electrodes of the detector depends on the position in three dimensions of the interaction as well as time and amount of charges generated. The properties of the material determine, in part, the true estimate of the location, time and amount of charges generated within the device under test. In principle, the quality of each detector must be optimal in order to use these detectors. This significantly increases manufacturing cost and prohibits the use of lower quality materials in high demanding applications.

Signals induced due to the drift of charges (e.g., electrons and holes) within a solid-state device are characteristics of the material properties of the device itself. This is known as the response function of the device, i.e., semiconductor radiation detector response. The response function of different devices is not the same for any two detectors, mainly due to imperfect fabrication processes. Thus, two devices produced from the same batch may have slightly different material properties, and respectively different detector responses. In order to estimate the unknown amount of charge and three-dimensional (3D) location of charges generated within the device by an incident particle, the response function of the device is used to invert the problem.

This inverse problem may be solved, sub-optimally, assuming an average material property value. Simply inverting the problem becomes ill-conditioned due to a limited number of measurements and a large number of unknowns. Finding the location as a function of space and time is dependent on having a database (e.g., look-up tables (LUTs)) for electrical signals corresponding to interaction in each position of the sensor. A "matched filter" of the obtained signal with signals in the database using convolution in time domain or product of response functions in frequency domain finds the location and energy of interaction of the charges created by the incident particle within the sensor. The matching may instead be performed with a maximum likelihood estimator. These solutions are difficult to achieve due to the large volume of data needing to be stored in the database. The inverse problem may be solved using matrices of very large dimensions and inverting them, which requires high computational power and time.

SUMMARY

By way of introduction, the preferred embodiments described below include methods, systems, and non-transitory computer readable media for training to and/or estimating location, energy level, and/or time of occurrence of incident radiation on a solid-state detector. A machine-learned model, such as a neural network, performs the inverse problem. An estimate of the location, energy level, and/or time is output by the machine-learned model in response to input of the detected signal (e.g., voltage over time). The estimate may account for material property variation of the solid-state detector in a rapid and easily calculated way, and with a minimal amount of data.

In a first aspect, a method of detecting incident radiation with a solid-state detector is provided. A solid-state detector forms a first signal in response to the incident radiation being received by the solid-state detector. A first position and a first energy level of the incident radiation are determined from the first signal. A first neural network outputs the first position and first energy level in response to input of the first signal. An image is generated from the first position and first energy level.

In a second aspect, a method is provided for machine training of inverse detection by a solid-state detector. A discriminator receives first samples of signal measured by the solid-state detector in response to input energies at input locations and receives second samples of signal created by a machine-learned generator in response to the input energies and the input locations. The discriminator is machine trained to output corrected energies and corrected locations in response to the first samples based on the first samples, second samples, the input energies, and the input locations. The machine-trained discriminator is stored.

In a third aspect, a system is provided for detection of incident radiation. A solid-state detector is configured to generate a signal in response to receipt of the incident radiation. A processor is configured to determine a location of the incident radiation on the solid-state detector. The location determined by a machine-learned model in response to input of the signal to the machine-learned model.

The present invention is defined by the following claims, and nothing in this section should be taken as a limitation on those claims. Features, embodiments, or aspects of one type of claim (e.g., method or system) may be used in another type of claim (e.g., system or method). Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION

An inverse neural network model solves for the position, time, and/or amount of charge generated in a solid-state device due to particle interactions. The initial position of charges, such as electrons and holes, within a solid-state device are determined by inverting the problem using a neural network approach. The location, time, and/or energy of interaction of gamma rays with the sensor is solved using deep learning. For example, a neural network model generates a true 3D location, amount of charge, and/or time from measured signals in a solid-state device (e.g., semiconductor radiation detector).

In one embodiment for training the neural network, the initial amount of charge generated within a solid-state device is obtained using measured properties of the material. Increased accuracy of the predicted value of the initial amount of charge, electrons and holes, and 3D position of the interaction is provided due to the use in training of this microscopic model of the material properties individualized sensor-by-sensor. In principle, if the material of the solid-state detector is characterized at a microscopic level, materials having worse material uniformity may be used to provide a similar quality estimation, and/or better-quality estimation is provided by materials having a same or even lesser quality control.

After training, the inverse neural network is used in real-time application (e.g., detection for imaging during an appointment and/or within a few seconds of completion of the detection). These real-time applications are enabled by simpler and faster implementation and computation due to use the machine-learned model. The corrections or more accurate location, energy, and/or time are provided on-the-fly with more precision. The technique gives better and more accurate position and charge information while being accelerated using simpler implementation in field programmable gate array (FPGA) and/or computer or graphics processing unit (CPU/GPU). The intrinsic position, energy, and/or time resolution of the solid-state detector may be improved using the trained neural network.

Figure 1:
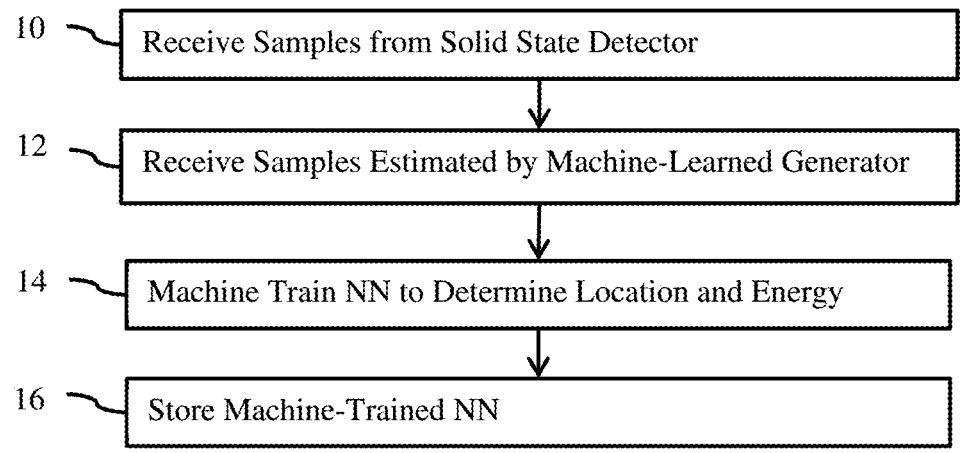
FIG. 1 is a flow chart diagram of one embodiment of a method for machine training to estimate location, energy, and/or time of incident radiation on a solid-state detector.

FIG. 1 shows one embodiment of a method for machine training of inverse detection by a solid-state detector. Machine learning, such as deep learning, trains a model to estimate correct position, energy, and/or time given a signal from a solid-state detector. The machine training is performed for a particular solid-state detector in order to provide the machine-learned model for the defects of that detector.

Figure 8:
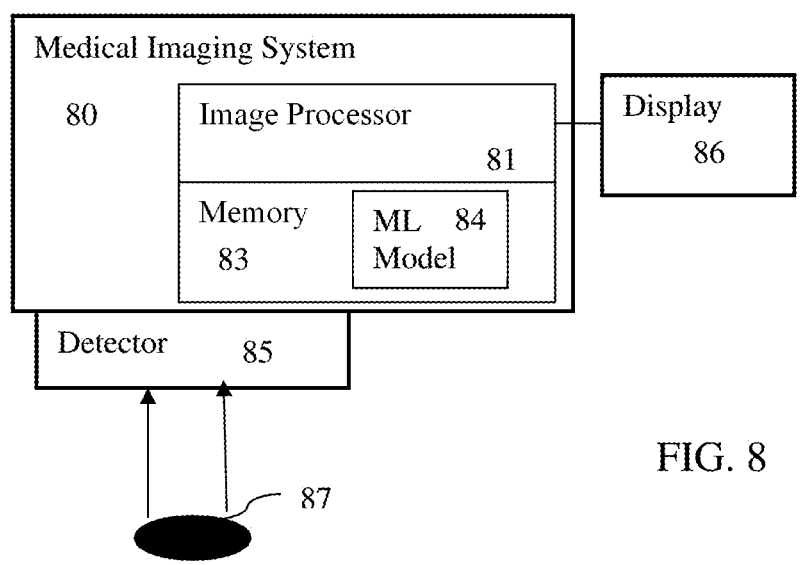
FIG. 8 is a block diagram of one embodiment of a medical imaging system for detection of incident radiation.

The acts are performed by the system of FIG. 8 or a different system. For example, a server, workstation, computer, or other processor receives the samples, performs the machine training, and uses a memory to store the machine-learned model. The solid-state detector is used to generate samples. A memory and/or simulator implemented by the same or different processor provides samples. Other devices may perform any of the acts.

Additional, different, or fewer acts may be performed. For example, act 16 is not provided. As another example, act 10 is not provided where the training data is previously collected or generated. In yet another example, acts related to training a generator to estimate signal based on location, energy, and/or time, configuring an architecture of the network for machine training, and/or application of the machine-learned model are provided.

The acts are performed in the order shown (i.e., top to bottom or numerical) or a different order. For example, acts 12 and 10 may be performed in reverse order or simultaneously.

In act 10, a processor or another machine receives samples of signals from the solid-state detector. The samples are training data for machine learning, such as training a discriminator or other neural network. The training data includes tens, hundreds, or thousands of samples. Multiple samples are provided for each location or voxel of the solid-state detector.

The samples are generated by transmitting radiation (e.g., x-ray or gamma) in separate events to different locations on the solid-state detector. In a testing lab or other environment with controllable radiation generation in location, energy, and/or time, the solid-state detector is used to generate the many samples. For PET or SPECT, a radiation source at a known energy or energies and a collimator are used to control application of incident radiation using a shutter for known time. Alternatively, a simulation tool is used. The simulation models the solid-state detector to generate the signal in response to simulated input or injection at a given location, energy, and/or time.

The solid-state detector or simulation generates voltage as a function of time in response to each instance of incident radiation. The voltage resulting from potential or charge difference between an anode and cathode of the solid-state detector over time is generated as a signal responsive to the incident radiation.

Each sample includes input data and ground truth data. The machine training learns from the samples to estimate an output from the input. The ground truth data are the actual output given the input. The input is the signal generated by the solid-state detector, and the output is the position, energy, and time of application of the incident radiation to the solid-state detector. By comparing estimates output by the machine-learned network given the input to the ground truth, the machine learning alters the values of learnable parameters (e.g., weights, convolution kernels, and/or connections) of the network to best predict the output given an unseen input.

In act 12, the processor or other machine receives samples created by a machine-learned generator, machine-learned model, simulator, or another source of the signal if generated with known material defects. The machine-learned generator attempts to create $\hat{y}$, which is an estimate of y. The samples are voltage over time for a solid-state detector with known material defects given a known location, energy, and/or time used for generating the samples in act 10. Pairs of samples, the signal generated by the solid-state detector and the signal from a model of solid-state detection, are received in acts 10 and 12.

The samples received in act 12 may be generated from one of various sources. For example, experimental measurements from an ideal or high-quality solid-state detector are used. As another example, simulations using dedicated equipment may be used. The material property may be assumed to be uniform or not. Analytical solutions for solving nonlinear transport equations in semiconductors may be performed using numerical methods. A machine learning-based multiscale method may be used for computation of charge transport properties focusing on prediction of electronic transfer integrals.

In one embodiment, the samples are created by a machine-learned generator in response to input energies, locations, and/or times. The generator is a U-net, fully connected neural network, convolutional neural network, image-to-image network, or other generator of a continuous or sampled output given input scalars. The input position, energy, and/or time scalars are mapped, by the machine-learned generator, to the voltage over time.

The machine-learned generator is a model machine trained for the material properties of the solid-state detector. A space-time electron-hole charge transport network is used for solid-state material studies. The problem of measuring semiconductor material properties is modeled as a physics-based neural network with weights that are directly related with the physical properties of the material. The characteristics of the material are obtained by solving for the weights in an inverse manner. The output signals and input charges, as many training samples, are used to optimize the weights of the model. A gradient descent-based approach may be taken to optimize the weights of the model based on the loss function computation in each step.

In contrast to conventional, analytical solutions for solving the nonlinear transport equations, the transport problem is formulated in this neural network framework that incorporates the underlying laws of physics. This neural network framework applies deep learning to use multiple layers of the neural network framework to progressively extract phenomenon related to semiconductor evaluation from the raw input.

The physics-based neural network addresses four phenomenon related to semiconductor evaluation: transport of electrons and holes; trapping and de-trapping of electrons and holes; recombination of electrons and holes; and diffusion of electrons and holes. Each of the phenomenon is modeled in the neural network framework as one or more weights. Each input to a node of the neural network is assigned a weight on the basis of that input's importance relative to other inputs to the neuron. Weights are learned during the training process. The physics-based neural network is trained using a pair of output signals (from the electrodes) as well as input charge to a discrete element (i.e., 3D location) of the material (referred to herein as a "voxel"). The physics-based neural network determines the weights that are identical to the exact parameters estimated from simulation and theoretical calculations.

The semiconductor material is assumed to be composed of N number of voxels. This represents a discretization of the solid-state detector in the space. The semiconductor material has a cathode on one end and anode on the other end in space. Grids of anodes and/or cathodes may be used. Electrons move from the cathode to anode and holes move from anode to cathode. While the charges transport, the phenomenon of transport, diffusion, trapping, de-trapping and recombination occurs. Assuming causality holds, voxels may be modeled as nodes in space and time, which leads to the formation of "static" space-time fabric.

The physics-based neural network may be constructed in two phases. The network is developed in one-dimensional space and then, the network is expanded in higher dimensional space. The number of unknown weights in the physics-based neural network is equal to the number of unknown parameters in the material (i.e., the number of parameters in the design space).

The physics-based neural network does not require several experimental setups or numerous simulations in order to estimate the material properties. The physics-based neural network provides a way of estimating the microscopic properties of the solid-state detector but with the numerical accuracy close to simulations. The physics-based neural network optimizes itself based on the gradient descent steps in optimization depending only on output signals and input charge (location, energy, and/or time) in the voxels. The optimization may be performed based only on the signals without using complicated measurements.

In act 14, the processor or other machine performs machine training. The samples from the solid-state detector and the samples accounting for imperfections, such as from the machine-learned generator, are used as training data for machine training. The training data also includes the ground truth location, energy, and/or time for the inverse problem. The model machine learns to output correct energies, locations, and/or times in response to input of the samples from the solid-state detector. The samples from the model of material properties (e.g., from the machine-learned generator) may also be used in training.

A model, such as a neural network, is trained. The model or network includes learnable parameters, the values of which are determined in machine training to output the energy, location, and/or time from an input detected signal. For example, the machine training determines the values of the learnable parameters (e.g., weights, connections, filter kernels, pooling, . . . ) that estimate the 3D position and the energy given a specific or unseen signal from the solid-state detector.

In one embodiment, deep learning is used. A neural network (e.g., deep learning) arrangement is defined. The definition is by configuration or programming of the learning. The number of layers or units, type of learning, and other characteristics of the network are controlled by the programmer or user. In other embodiments, one or more aspects (e.g., number of nodes, number of layers or units, or type of learning) are defined and selected by the machine during the learning.

The neural network is defined as a plurality of sequential feature units or layers. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous or subsequent layer or unit. Skip connections bypassing one or more layers may be used. A dense network of a plurality of layers feeding forward to one subsequent layer may be used.

Rather than pre-programming the features and trying to relate the features to the output, the deep architecture is defined to learn the input features at different levels of abstraction through deep learning. The features are learned to reconstruct lower level features (i.e., features at a more abstract or compressed level). Each node of the unit represents a feature. Different units are provided for learning different features.

Within a unit or layer, any number of nodes is provided. For example, 100 nodes are provided. A different number of nodes may be provided for different units or layers. Later or subsequent units may have more, fewer, or the same number of nodes. The features of the nodes are learned by the machine using any building blocks. For example, auto-encoder (AE) or restricted Boltzmann machine (RBM) approaches are used. Sparse denoising AE (SDAE)) may be employed to constrain the freedom of parameters and force learning of interesting structures within the data. Enforcing sparsity within hidden layers (i.e., only a small number of units in hidden layers are activated at one time) may also regularize the network. In other embodiments, at least one unit is a convolution with ReLU activation or is a batch normalization with a ReLU activation followed by a convolution layer (BN+LeakyRU+convolution). Different units may be of the same or different type.

Any neural network architecture may be used. The architecture is the arrangement of layers for the network. In one embodiment shown in FIG. 2, a discriminator network 22 is used. The discriminator network 22 is a neural network for distinguishing between actual and created signals. The discriminator network is defined to receive the samples, Y, from the solid-state detector. The corrected samples (e.g., samples, $\hat{Y}$, from the machine-learned generator 20 or other model of signal generation given incident radiation at a given position ($X_{pos}$), energy (E), and/or time) are also to be input to the discriminator network 22 in training. The discriminator learns to distinguish the actual measurements, Y, from created or more ideal measurements, $\hat{Y}$. Rather than or in addition to a binary (e.g., softmax) layer output of real or not, the discriminator network 22 is defined to output one or more scalar values, such as five scalar values for x position, y position, z position (i.e., 3D location shown as $\hat{X}pos$), energy (shown as $\hat{E}$), and time. The scalars may have any range and/or resolution. The discriminator architecture is defined to perform the inverse problem—generation of position, energy, and/or time from the signal generated by the solid-state detector.

Where the generator 20 is a machine-learned network, the generator 20 and the discriminator network 22 form a generative adversarial network (GAN). The GAN is trained to estimate the location and energy of interaction of photons and charge particles, within the solid-state detector. The generator 20 is the forward model, which uses the position of interaction $X_{pos}$ and number of charges Qe and Qh (e.g., E) to produce the electrical signals $\hat{Y}$, which are close to the measured electrical signal Y. The discriminator 22 is a neural network model that takes in input, electrical signals Y, and generates the position and energy of interaction $\hat{X}_{pos}$, $\hat{E}$.

Various neural network architectures may be used for the discriminator network 22. For example, a convolutional (encoder)-transposed-convolutional (decoder) network, such as a U-net, is used. Other fully convolutional networks may be used. As another example, a DenseNet is used. A multi-channel input (e.g., different input channels for the actual and created signals) and a multi-channel output (e.g., for each scalar with or without a binary input of the discrimination) with any number of intervening layers is provided.

Figure 3:
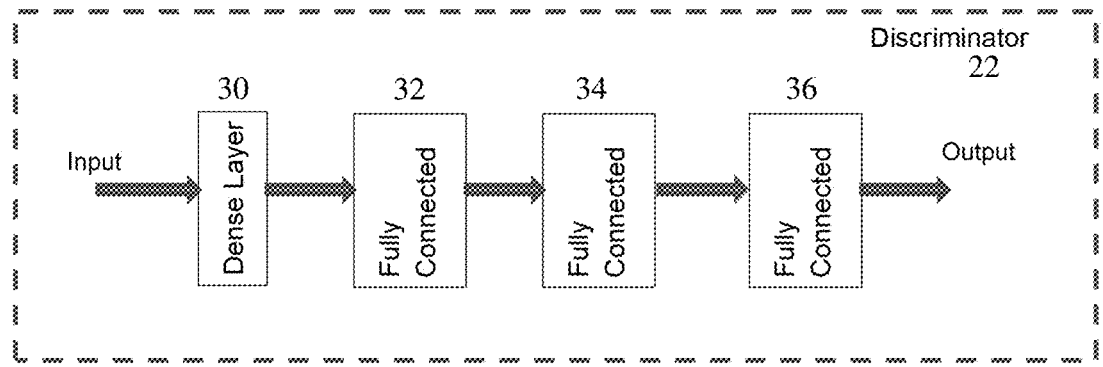
FIG. 3 illustrates an example neural network for estimating location, time, and/or energy from a detector signal.

FIG. 3 shows one example embodiment of the discriminator network 22. The discriminator network 22 includes four layers, a dense layer 30 followed by three fully connected layers 32-36. The dense layer 30 and the fully connected layers 32-36 may be a same type of layer and are labeled differently since the dense layer 30 combines 10 different electrode signals (y) and flattens the tensor, while the fully connected layers 32-36 work on the tensor, reducing the dimension to 1. After the dense layer 30, the fully connected layers 32-36 sequentially reduce the dimensionality of the layer to 1 (e.g., by reducing the array to scalar). The fully connected layers 32-36 are matrices for reduction, reducing the dimension to 100, 10, and finally 1. Other reductions, no reduction, and/or other rates of reduction may be used. Other layers may be included, such as a softmax, one or more pooling (e.g., max pooling), one or more convolutional, and/or one or more normalization layers. Other orders of layers, numbers of dense layers, numbers of fully connected layers, and/or numbers of overall layers may be used. Other arrangements or orders of layers may be used.

The machine (e.g., processor) trains the defined neural network arrangement. The training data samples and ground truths are used to train the neural network (e.g., discriminator 22) or model. One network is trained to output the 2D or 3D position, energy, and/or time. Alternatively, different networks are trained to output values for different parameters, such as one network for position, another network for energy, and a third network for time.

In training, the similarity of the estimated position, energy, and/or time to the ground truth is minimized. In one embodiment, the loss in training is of the estimated position and energy. The difference between the estimated position and the known or ground truth position provides a position loss. The difference between the estimated energy and the known or ground truth energy provides an energy loss. The loss function is a sum, average, or weighted combination of the position and energy losses. The position and energy losses are minimized. Various loss functions may be used, such as training as a standard regression problem with the sum-of-squared differences loss. Other loss functions include L1 or L2 loss.

Any optimization may be used, such as Adam, RMSprop optimizer, or SGD. In one embodiment, the weights and the biases are learned using optimization techniques with back propagation of gradients (i.e., ADAM). Batch normalization, dropout, and data augmentation may be used. During the optimization, the different distinguishing features of the input data (i.e., signal) are learned. The features providing an indication of position, energy, and/or time are learned. Any number of epochs may be used in the optimization.

Where the GAN is used, the generator network 20 is trained prior to the discriminator network 22. The training of the generator model (forward model) is done first. Then, the discriminator network 22 is trained with the output signal, $\hat{Y}$, from the generator and the actual signals Y from the solid-state detector. The generator network 20 may be retrained, updated, or refined in a back-and-forth sequential training of the discriminator network 22 and the generator network 20. Alternatively, the generator network 20 as trained initially is fixed during training of the discriminator network 22. The discriminator is trained both on actual output signals Y and generated signals $\hat{Y}$ in order to minimize the loss between the $\hat{X}_{pos}$ and Qe, h generated by the measured and generated signals. During actual use after training, the inverse model (e.g., machine-trained discriminator network 22) is used without the generator network 20.

Figure 2:
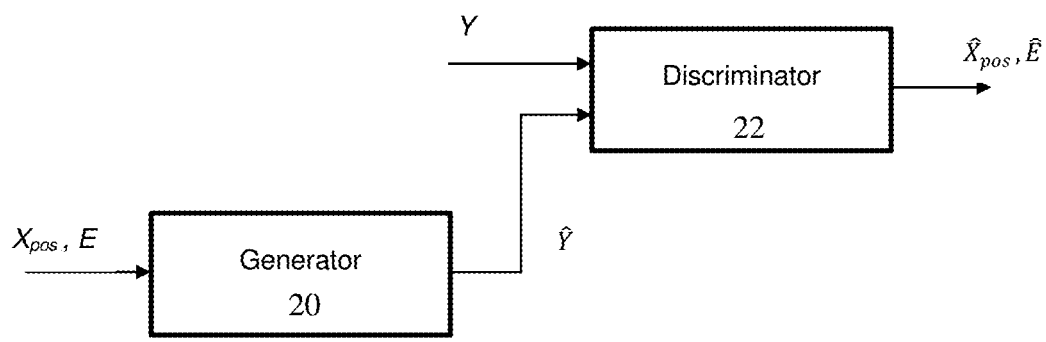
FIG. 2 is a block diagram representing a generative adversarial network used to train a discriminator for the inverse signal-to-location and energy estimation.

In act 16, the machine (e.g., processor) outputs a trained neural network, such as the machine-learned discriminator 22 of FIG. 2. The machine-learned network incorporates the deep learned features for the various units and/or layers of the network. The values for the learnable parameters of the architecture result from training. The architecture and the values of the learnable parameters are output as the machine-learned network or model.

Once trained, a matrix, kernels (e.g., learned convolution weights), or other trained network is output. The data represents the trained architecture. The machine-learned network includes definitions of convolution kernels and/or other characteristics of the neural network trained to determine position, energy, and/or time from an input signal from the solid-state detector.

The machine-learned network is output to a computer network or memory. For example, the neural network as trained is stored in a memory for transfer and/or later application. Once the network is trained, the network may be applied.

Figure 4:
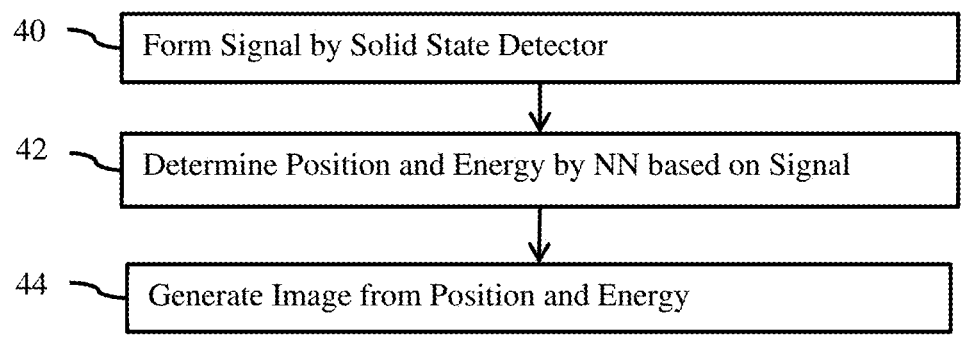
FIG. 4 is a flow chart diagram of one embodiment of a method for detecting incident radiation with a solid-state detector.

FIG. 4 shows one embodiment of a method for detecting incident radiation with a solid-state detector. The machine-trained model, such as the discriminator neural network 22, is used to determine the position, energy, and/or time of incident radiation on the solid-state detector. The incident radiation may be x-ray or gamma emissions. For example, the machine-trained model is applied in a PET or SPECT imaging system or scanner. The detected position, energy, and/or time are used for emission detection and related reconstruction for PET or SPECT imaging. Similarly, the detected location, energy, and/or time may be used for x-ray imaging, such as computed tomography imaging. The SPECT example is used in the description of FIG. 4, but other medical imaging or non-medical detection may use the solid-state detector and corresponding machine-learned model.

The method is applied for a given scan of a given patient. For the SPECT or PET application, the patient includes a radiotracer with an isotope for emitting energy. The emissions are collimated and detected using a scan protocol and used in reconstruction. The 2D or 3D position, energy, and/or time determined by the machine-trained model based on signal generated by the solid-state detector are used as the detected events or emissions.

The acts are performed by the system of FIG. 8 or a different system. A solid-state detector, such as a gamma camera, detects emissions, forming the signal in act 40. A processor, such as a SPECT system computer, determines the position, energy, and/or time of occurrence of the incident radiation on the solid-state detector using the machine-trained model in act 42. In act 44, the processor or another processor (e.g., graphics processing unit) reconstructs an image from a plurality of detected events (i.e., separately detected instances of incident radiation). The positions, energies, and times are used to reconstruct an image representing the emissions from the patient. Other devices may perform any of the acts.

Additional, different, or fewer acts may be performed. For example, act 40 is not provided where the signals are stored or transferred from memory. As another example, act 44 is not provided where the detected events are used for purposes other than imaging, such as to calculate a quantity. In other examples, acts related to positioning the patient, configuring the SPECT scanner, rotating the detector about the patient, and/or SPECT imaging are provided. The acts are performed in the order shown or a different order.

In act 40, the solid-state detector forms a signal. In response to incident radiation interacting with the solid-state detector, a signal of voltage over time is generated. The signal may be concentrated or specific to one region of the solid-state detector, such as by using different anodes at different locations in two dimensions on the solid-state detector. One instance of incident radiation provides one signal. More than one instance may be detected with or without overlap in time and/or location of the signal.

In the SPECT example, the solid-state detector of the SPECT system detects emissions from a patient. The SPECT detector is a gamma camera. For example, the detector is a large volume solid-state photon detector layered as a 2D array of detectors forming a larger panel to increase the field of view. The sensors are arranged along a rectangular or other grid to provide a two-dimensional planar array for detecting gamma radiation.

After administering (e.g., ingesting or injecting) the radiotracer into the patient, the patient is positioned relative to a SPECT detector, and/or the SPECT detector is positioned relative to the patient. Emissions from the radiotracer within the patient are detected over time. A collimator in front of the detector limits the direction of photons detected by the SPECT detector, so each detected emission is associated with an energy and line. In other cases, there is no physical collimation and the direction of photons is given by a cone of possible directions in the patient from which the emission occurred. Other types of collimators may or may not be provided in other embodiments. The SPECT detector may be rotated or moved relative to the patient, allowing detection of emissions from different angles and/or locations in the patient. In other SPECT systems, the detector does not need to rotate around the patient.

In act 42, a processor determines a position, energy level (i.e., amount of energy or charge), and/or a time for each incident radiation event. The position, energy level, and/or time is determined from the signal. The signal from the solid-state detector is used to detect the incident radiation on the solid-state detector.

One, two, or all three of position, energy level, and time are determined using a neural network or another machine-trained model. For example, the discriminator 22 is used to determine the position and energy from the signal. A time of signal generation is determined from a clock or circuitry. In other examples, the energy and time are determined from the signal and/or circuitry without the machine-trained model, which determines the position on the solid-state detector.

The position, energy level, and/or time are output by the neural network as machine trained in response to input of the signal. As each signal is formed by the solid-state detector, such as due to emissions from the patient, the neural network is used to determine the position, energy, and/or time of the incident radiation. The lateral position of the line or cone intersecting the detector and/or 3D position of the interaction relative to the detector is determined from the generated or formed signal.

The position is determined as two dimensions along the 2D face of the solid-state detector. Alternatively, the position within the detector is determined in three dimensions. The location of interaction of the incident radiation with the solid-state detector in both the 2D lateral locations (i.e., face of the detector) as well as depth in the detector is determined. The machine-learned model outputs the 3D location in response to the input signal.

In the GAN embodiment, the discriminator network 22 determines the location, energy level (e.g., amount of charge), and/or time. The generator 20 is not used in application for actual detection. The generator 20 is used in training the discriminator network 22 to provide a model of material properties of the solid-state detector but not used in application. For example, the 3D position and energy level are determined by the discriminator 22 without input of corrected signal from the generator 20. The signal, Y, from the solid-state detector is input to determine the position and energy level. Other neural networks as machine trained or other machine-trained models may be used to determine the location, energy level, and/or time.

In act 44, an image processor generates an image from the position, energy level, and/or time. For example, an x-ray (e.g., angiography, fluoroscopy, or computed tomography), PET, or SPECT image is generated. After formation of a plurality (e.g., hundreds or thousands) of signals and corresponding determination of the location, energy level, and time for each, an image is generated. The image may be generated from the detected events using tomography. Any reconstruction of 3D distribution of emissions or tissue response in the patient may be used. Alternatively, the image is generated as a 2D x-ray image from detections across the lateral 2D positions of the solid-state detector.

For SPECT and PET, depth information or Z dimension may be used to correct for parallax, reducing the uncertainty between the estimated position of where the two 511 keV photons originated in the body in PET and the direction of the photon in SPECT. In semiconductor detectors, i.e., CdTe, CZT, the depth or Z dimension is used to correct for the signal loss due to material defects, i.e., trapping, recombination, and charge transport properties in the bulk, diffusion. The voltage signals are highly dependent on where the photons interact in the depth or Z dimension.

For SPECT or PET, the results of the reconstruction represent a distribution of emissions or counts of emissions in three-dimensions within the patient. An image is generated from the reconstructed object (e.g., whole patient or part of the patient). In one embodiment, data for one or more (e.g., multi-planar reconstruction) planes is extracted (e.g., selected and/or interpolated) from a volume or voxels and used to generate a two-dimensional image or images. In another embodiment, a three-dimensional rendering is performed. Projection or surface rendering is used to create a representation of the volume or part of the patient from a given viewing direction on the two-dimensional screen.

Any SPECT or PET image may be displayed alone, adjacent to a computed tomography (CT) image, or overlaid on a CT image (e.g., color for SPECT and grayscale for computed tomography). Multi-modality images with magnetic resonance, ultrasound, x-ray, or other modalities may be used.

Figure 5:
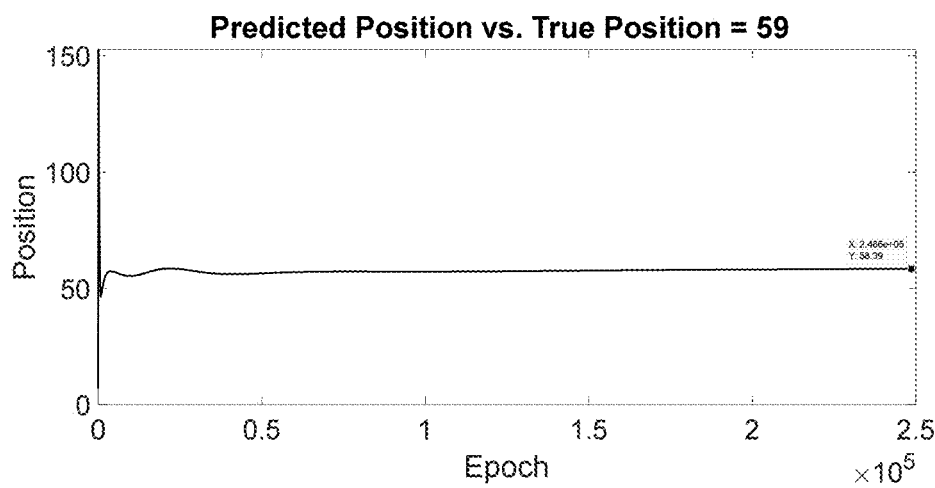
FIGS. 5-7 illustrate examples of estimated position as a function of neural network epochs.
Figure 6:
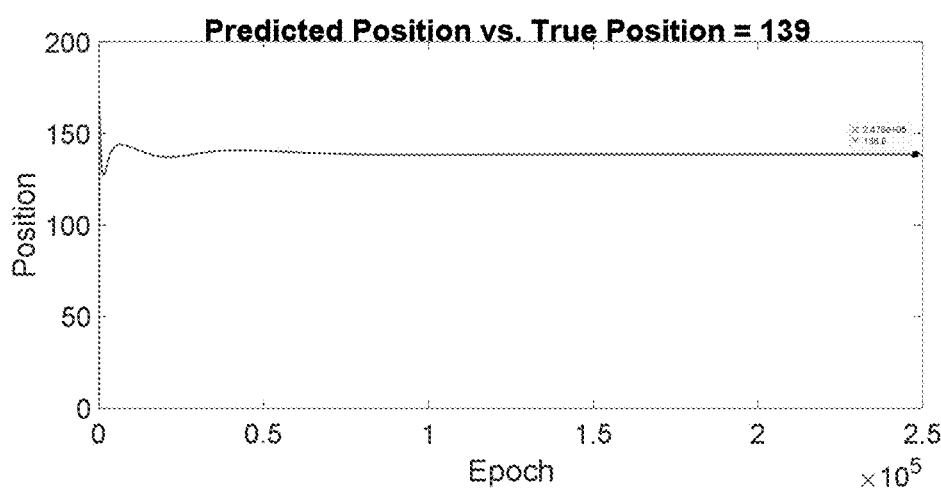
Figure 7:
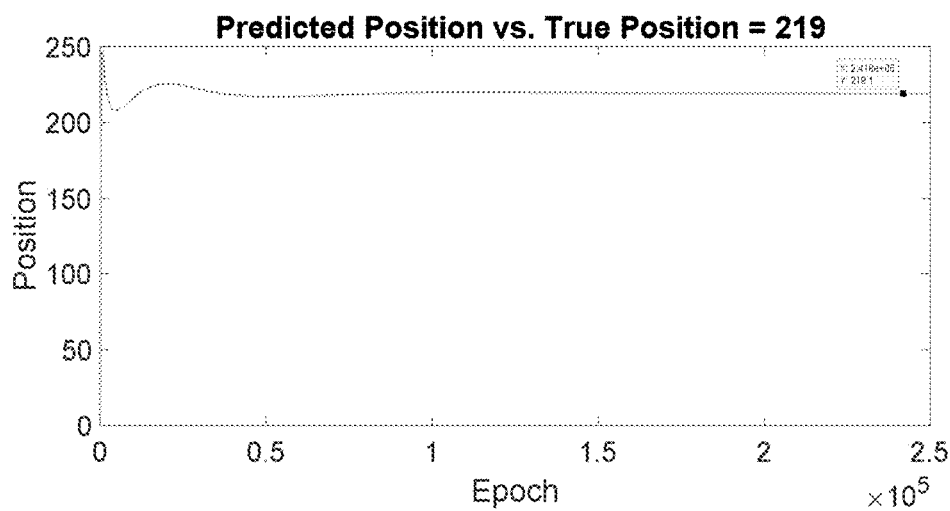

FIGS. 5-7 show example proof of concept results. Using the GAN of FIG. 2, the discriminator 22 of FIG. 3 is trained. The discriminator network 22 is a neural network model, which estimates the position. The neural network model may have been trained over any number of epochs. Neural network models trained over different numbers of epochs are represented in FIGS. 5-7. The solid-state detector is divided into any number of voxels, such as 256 voxels in 64×64 lateral grid with 64 depths or layers. Each voxel is numbered, such as voxels 1-256 representing specific 3D locations in the solid-state detector. FIGS. 5-7 show the estimated position for signals actually at voxel positions 59, 139, and 219, respectively. For FIG. 5, the neural network model converges to an estimate of 58.39 for signals from voxel 59. For FIG. 6, the neural network model converges to an estimate of 138.6 for signals from voxel 139. For FIG. 7, the neural network model converges to an estimate of 219.1 for signals from voxel 219. The neural network provides accurate estimates of position.

Due to better accuracy of detection, solid-state detectors with more defects may be used. Cheaper or less rigorous manufacturing may be used to form the solid-state detector while maintaining current standards. Alternatively or additionally, greater accuracy is provided by solid-state detectors manufactured to current or better standards. The use of a machine-learned model to estimate position, energy, and/or time allows for more accuracy and/or less rejection of solid-state detectors due to defects.

FIG. 8 shows a system for medical imaging, such as SPECT, PET, or CT imaging. The system includes a detector 85 for detection of incident radiation from or through the patient 87. Other systems using the solid-state detector and corresponding machine-trained model for the solid-state detector may be used. Many engineering and medical fields benefit from solid-state materials being used as detectors, where such fields may benefit from the machine-learned model for estimation in detection.

The location, amount of charge, and/or time is determined by a machine-learned model from signals from the solid-state detector. The system implements the method of FIG. 4 or another method.

The system includes a medical imaging system 80, an image processor 81, a memory 83, and a display 86. The image processor 81, memory 83, and/or display 86 are part of the medical imaging system 80 or are separate (e.g., a computer or workstation). Additional, different, or fewer components may be provided. For example, the system is a computer without the medical imaging system 80. As another example, user input, patient bed, or other SPECT related devices are provided. Other parts of the system may include power supplies, communications systems, and user interface systems.

Any now known or later developed medical imaging system 80 may be used, such as a SPECT, CT, PET, or x-ray imaging system. The medical imaging system 80 includes the solid-state detector 85 with or without a collimator. Other components may be provided. For CT or x-ray, an x-ray source positioned on an opposite side of the patient 87 from the detector 85 is provided to transmit x-rays, which x-rays pass through the patient and are detected by the detector 85. For SPECT or PET, emissions from a radiotracer in the patient 87 are detected by the detector 85.

The solid-state detector 85 is semiconductor material, such as CdZnTe, CdTe, HPGe, or TlBr. The detector 85 has a cathode and anode (e.g., a grid of anodes) on an opposite side as the cathode. The solid-state detector 85 is configured by design to generate a signal in response to receipt of incident radiation. When the radiation interacts with the solid-state detector 85, electron and hole charges are formed. A voltage difference due to the charges results across the anode and cathode. A voltage signal over time is formed in response to the incident radiation.

For SPECT, the detector 85 is a gamma camera connected with a gantry. The gamma camera is a planar photon detector. The gantry rotates the gamma camera about the patient. During scanning of a patient, emission events are detected with the camera at different positions or angles relative to the patient. Alternatively or additionally, a patient bed moves the patient 41 relative to the detector 85 and collimator.

The medical imaging system 80, using the detector 85 with or without a collimator, detects emissions from the patient 87. The detector 85 detects emissions at a range of energies. The energy range corresponds to energy of the isotope in the patient. The energy level of the incident emissions may be determined from the detector signal for verifying whether to count the incident radiation in SPECT imaging. The emissions occur from any location in a finite source (i.e., the patient). For tomography, the location of detection on the solid-state detector 85 is determined from the signal generated by the detector 85. The radiotracer in the patient migrates to, connects with, or otherwise concentrates at specific types of tissue or locations associated with specific biochemical reactions. As a result, a greater number of emissions occur from locations of that type of tissue or reaction.

The image processor 81 is a general processor, artificial intelligence processor or accelerator, digital signal processor, graphics processing unit, application specific integrated circuit, field programmable gate array, digital circuit, analog circuit, combinations thereof, or other now known or later developed device for processing emission information, applying a machine-learned network, and/or generating an image based on detected locations, energies, and/or times of incident radiation. The image processor 81 is a single device, a plurality of devices, or a network. For more than one device, parallel or sequential division of processing may be used. Different devices making up the image processor 81 may perform different functions, such as one processor (e.g., application specific integrated circuit or field programmable gate array) for applying a machine-learned network and another processor (e.g., graphics processing unit or field programmable gate array) for reconstructing from detected events (i.e., locations, energies, and/or times). In one embodiment, the image processor 81 is a control processor or other processor of the medical imaging system 80. In other embodiments, the image processor 81 is part of a separate workstation or computer.

The image processor 81 operates pursuant to stored instructions to perform various acts described herein, such as acts 42 and 44 of the method of FIG. 4. The image processor 81 is configured by software, firmware, and/or hardware to perform the acts.

The image processor 81 is configured to determine a location of the incident radiation on the solid-state detector 85. The energy and/or time of the incident radiation may be determined. The location, energy, and/or time are determined by a machine-learned model 84 in response to input of the signal to the machine-learned model 84. The image processor 81 applies the signal from the solid-state detector 85 to the machine-trained model 84, which outputs the event information in response. The location on or in the solid-state detector 85 is output in two or three dimensions. The energy of the incident radiation is determined. The time of occurrence of the incident radiation is determined. The machine-trained model 84 is used for determining some or all of the event information. In one embodiment, the machine-learned model 84 outputs the location on the solid-state detector 85 in three dimensions and the energy of the incident radiation. Circuitry and/or other signal processing may be used to determine the location, energy, and/or time.

In one embodiment, the machine-learned model 84 is a discriminator of a GAN. The GAN is formed by the generator and the discriminator. The generator was trained as a model of material properties of the solid-state detector and used in the training of the discriminator. The machine-learned model 84 may be a neural network. The machine-learned model 84 was trained to distinguish, by position on the solid-state detector, a created signal from actual signal. For any given position, the machine-learned model 84 as trained may determine position, energy, and/or time from the signal generated by the solid-state detector 85.

The image processor 81 is configured to generate an image from the detected events. The locations, energies, and/or times from multiple events of incident radiation are used to form an image. Tomography or other reconstruction generates a representation of the patient or function in the patient from the detected events.

The display 86 is a CRT, LCD, plasma screen, projector, printer, or other output device for showing an image. The display 86 displays an image of the reconstructed representation (e.g., functional volume for PET or SPECT). Alternatively or additionally, any quantities derived by the image processor 81 may be displayed, such as uptake values and/or change in uptake value. Other quantities may be determined.

The formed signal, detected emission events (e.g., location, energy, and/or time), counts, machine-learned network, image, or other information are stored in the memory 83. The memory 83 may store data at different stages of processing, such as counts, raw data representing detected events without further processing, filtered or thresholded data prior to reconstruction, forward projections, backward projections, differences, projection operators, transposed operators, a measure of completeness of reconstruction, reconstructed data, filtered reconstruction data, thresholds, results of calculations, an image to be displayed, an already displayed image, or other data. The data is stored in any format.

The memory 83 is a buffer, cache, RAM, removable media, hard drive, magnetic, optical, database, or other now known or later developed memory. The memory 83 is a single device or group of two or more devices. The memory 83 is part of the medical imaging system 80 or a remote workstation or database, such as a PACS memory.

The memory 83 is additionally or alternatively a non-transitory computer readable storage medium with processing instructions. The memory 83 stores data representing instructions executable by the programmed image processor 81. The instructions for implementing the processes, methods, and/or techniques discussed herein are provided on non-transitory computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method of detecting incident radiation with a solid-state detector, the method comprising:
  measuring a first signal by the solid-state detector, the first signal generated in response to the incident radiation being received by the solid-state detector;
  inputting the measured first signal into a discriminator network configured to output a position and an energy level when input a measured signal from the solid-state detector, wherein the discriminator network is trained using a generative adversarial process as part of a generative adversarial network comprising the discriminator network and a generator network, wherein the generator network is a forward model that uses a position of an interaction and a number of charges to generate signal data, wherein the discriminator network is adversarially trained by inputting either the generated signal data or measured signal data and generating an estimated position and energy level;
  determining, by the discriminator network, a first position on the solid-state detector and a first energy level of the incident radiation on the solid-state detector from the measured first signal; and generating an image from the first position and the first energy level.

2. The method of claim 1 wherein the incident radiation comprises a gamma emission, and wherein generating the image comprises generating a positron emission tomography or a single photon emission computed tomography image.

3. The method of claim 1 wherein measuring the first signal comprises measuring the first signal as a voltage over time.

4. The method of claim 1 wherein the discriminator network comprises at least a dense layer and a fully connected layer.

5. The method of claim 1 wherein determining the first position comprises determining the first position in three dimensions.

6. The method of claim 1 wherein the generative adversarial process trains the discriminator network to minimize a similarity of an output estimated position and energy from the discriminator network to a ground truth value.

7. The method of claim 6 wherein the generative adversarial process includes inputting either a signal from the solid-state detector or a corrected signal generated by the generator network.

8. The method of claim 7 wherein the generator network comprises a model of material properties of the solid-state detector.

9. A method for machine training of inverse detection by a solid-state detector, the method comprising:
receiving, by a processor, first samples of signals measured by the solid-state detector in response to input energies at input locations;
receiving, by the processor, second samples of signals created by a machine-learned generator network in response to the input energies and the input locations, wherein the machine-learned generator network uses a forward model that uses the input energies and the input locations to generate sample signal data;
machine training a discriminator network configured to output a position and an energy level when input a measured signal from the solid-state detector, wherein the discriminator network is trained using a generative adversarial process as part of a generative adversarial network comprising the discriminator network and the machine-learned generator network, wherein the discriminator network is adversarially trained by inputting either the first samples of signals or second samples of signals and generating an estimated position and energy level; and
storing the machine-trained discriminator network.

10. The method of claim 9 wherein receiving the first samples comprises receiving the first samples in response to gamma radiation incident on the solid-state detector.

11. The method of claim 9 wherein receiving the first and second samples comprises receiving the first and second samples as voltage over time signals.

12. The method of claim 9 wherein machine training comprises training the discriminator network as a dense layer and a fully connected layer.

13. The method of claim 9 wherein receiving the second samples comprises receiving from the machine-learned generator having been trained as a forward model of material properties of the solid-state detector.

14. The method of claim 9 wherein machine training comprises training the discriminator network with minimization of position loss and energy loss.

15. A system for detection of incident radiation, the system comprising:
a solid-state detector configured to generate signal data in response to receipt of the incident radiation; and
a processor configured to determine a location of the incident radiation on the solid-state detector, the location determined by a machine-learned model in response to input of the signal data to the machine-learned model, wherein the machine-learned model comprises a discriminator network of a generative adversarial network, the generative adversarial network comprising a generator and the discriminator, wherein the discriminator network is trained using a generative adversarial process as part of the generative adversarial network, wherein the generator network is a forward model that uses a position of an interaction and a number of charges to generate signal data, wherein the discriminator network is adversarially trained by inputting either actual signal data or generated signal data from the generator network and generating an estimated location and energy level.

16. The system of claim 15 wherein the discriminator network comprises a neural network having been trained to distinguish, by position on the solid-state detector, a created signal by the generator network from an actual signal.

17. The system of claim 15 wherein the signal data is a voltage over time, and the machine-learned model outputs the location in three dimensions and an energy of the incident radiation.

* * * * *